(12) United States Patent
Su

(10) Patent No.: US 9,609,314 B2
(45) Date of Patent: Mar. 28, 2017

(54) IMAGE CAPTURING DEVICE, CONTROL METHOD FOR GROUPING IMAGE CAPTURING DEVICES, AND CONTROL SYSTEM THEREOF

(71) Applicant: VIVOTEK INC., New Taipei (TW)

(72) Inventor: Sheng-Yung Su, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/742,299

(22) Filed: Jun. 17, 2015

(65) Prior Publication Data

US 2015/0381888 A1 Dec. 31, 2015

(30) Foreign Application Priority Data

Jun. 27, 2014 (TW) .............................. 103122294 A

(51) Int. Cl.
*H04N 5/232* (2006.01)
*G08B 13/196* (2006.01)
*H04N 17/00* (2006.01)
*H04N 7/18* (2006.01)

(52) U.S. Cl.
CPC ..... *H04N 17/002* (2013.01); *G08B 13/19689* (2013.01); *H04N 5/23206* (2013.01); *H04N 5/23238* (2013.01); *H04N 7/181* (2013.01)

(58) Field of Classification Search
CPC ............... H04N 5/23238; H04N 7/181; H04N 5/23206; H04N 5/23222; G08B 13/196; G08B 13/19641; G08B 13/19643; G08B 13/19645

USPC ... 348/143, 169, 187, 208.14, 211.3, 211.99, 348/211.2, 211.11, 157
See application file for complete search history.

(56) References Cited

U.S. PATENT DOCUMENTS

| | | | | |
|---|---|---|---|---|
| 2003/0210329 | A1* | 11/2003 | Aagaard | H04N 7/181 348/159 |
| 2005/0007453 | A1* | 1/2005 | Ahiska | H04N 7/183 348/143 |
| 2006/0181610 | A1* | 8/2006 | Carlsson | G06T 7/002 348/159 |
| 2008/0239102 | A1* | 10/2008 | Okada | H04N 5/262 348/240.99 |
| 2010/0002071 | A1* | 1/2010 | Ahiska | H04N 5/217 348/36 |

* cited by examiner

*Primary Examiner* — Tuan Ho
*Assistant Examiner* — Marly Camargo
(74) *Attorney, Agent, or Firm* — Maschoff Brennan

(57) ABSTRACT

An image capturing device, control method for grouping image capturing devices, and control system thereof are provided. The control method is applied in the control system for controlling image capturing devices. Every image capturing device includes a direction detection unit for indicating a current direction, a command receiving unit, a computing unit, a driving unit and an image capturing unit. The control method comprises the following steps. A steering command for indicating a specified region is provided to at least two image capturing devices. The computing unit calculates a steering angle according to the current direction and specified region. The driving unit drives the image capturing device to capture the specific region according to the steering angle.

12 Claims, 11 Drawing Sheets

IMAGE CAPTURING DEVICE, CONTROL METHOD FOR GROUPING IMAGE CAPTURING DEVICES, AND CONTROL SYSTEM THEREOF

CROSS-REFERENCE TO RELATED APPLICATIONS

This non-provisional application claims priority under 35 U.S.C. §119(a) on Patent Application No. 103122294 filed in Taiwan, R.O.C on Jun. 27, 2014, the entire contents of which are hereby incorporated by reference.

BACKGROUND

Technical Field

The present disclosure relates to an image capturing device and a control method and system for grouping image capturing devices, particularly relates to an image capturing device and a control method and system for grouping image capturing devices for synchronously controlling image capturing devices.

Description of the Related Art

In the modern society, many areas are installed with image capturing devices to record the dynamic images or provide live-view to managing staffs.

However, current image capturing devices in the area mostly belong to fixed image capturing devices and are not able to adjust the capturing direction according to different conditions of the area. Therefore, usually multiple image capturing devices are installed to avoid surveillance blind spots.

Moreover, the capturing directions of the image capturing devices in the area are usually different. Therefore, the managing staffs cannot obtain the information intuitively when watching the images captured by the image capturing devices. For example, when an object moves in the area, because the field of view of each of the image capturing devices is different, the moving direction of the object in the image of each of the image capturing devices is different. Consequently, the managing staffs cannot intuitively determine the moving direction of the object and it results in the inefficiency when the managing staffs monitor the area.

In addition, an image capturing device capable of moving the lens is available for users to turn the image capturing device to a specific area for capturing. However, the current image capturing device capable of moving the lens is an individual device and users need to set each of the image capturing devices to turn to the specific area while monitoring.

Due to the field of view limitation of the fixed image capturing device, the inability to observe the track and direction of the object, and the problem of setting each of the image capturing devices individually, a system and image capturing devices applying the control method for grouping image capturing devices is needed for the managing staffs to control the image capturing devices with groups, so that the managing staffs can intuitively determine the direction of the object in the image and increase the surveillance efficiency.

SUMMARY

A control method for grouping image capturing devices is adapted for controlling a plurality of image capturing devices. Each of the plurality of image capturing devices has a direction detection unit for indicating a current direction. The method includes providing a steering command to at least two of the plurality of image capturing devices, the steering command indicating a specified region, for each of the plurality of image capturing devices receiving the steering command, calculating a steering angle according to the current direction and the specified region, and driving each of the plurality of image capturing devices receiving the steering command to capture the specified region according to the steering angle.

An image capturing device includes a direction detection unit, an image capturing unit, a command receiving unit, a computing unit, and a driving unit. The direction detection unit is for indicating a current direction. The image capturing unit is for capturing an image of the current direction. The command receiving unit is for receiving a steering command and the steering command indicates a specified region. The computing unit is coupled to the direction detection unit and the command receiving unit is for calculating a steering angle according to the current direction and the specified region. The driving unit is coupled to the image capturing unit for driving each of the plurality of image capturing devices to capture the specified region according to the steering angle.

A control system for grouping image capturing devices includes a plurality of image capturing devices and an electronic device. Each of the plurality of image capturing devices includes a direction detection unit, an image capturing unit, a command receiving unit, and a driving unit. The direction detection unit is for indicating a current direction. The image capturing unit is for capturing an image of the current direction. The command receiving unit is for receiving a steering command, the steering command indicating a specified region. The driving unit is coupled to the image capturing unit for driving each of the plurality of image capturing devices receiving the steering command to capture the specified region, wherein the steering angle is calculated according to the current direction and the specified region. The electronic device is for generating the steering command.

BRIEF DESCRIPTION OF THE DRAWINGS

The present disclosure will become more fully understood from the detailed description given herein below and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
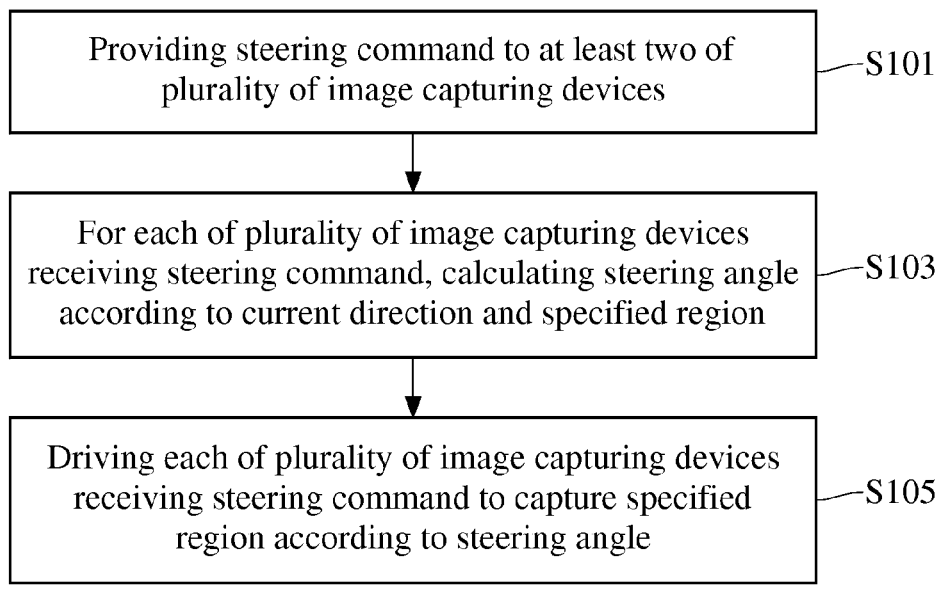
FIG. 1 is a flowchart of the control method for grouping image capturing devices according to an embodiment.

Please refer to FIG. 1. FIG. 1 is a flowchart of the control method for grouping image capturing devices according to an embodiment. As shown in FIG. 1, the control method for grouping image capturing devices of the present disclosure is adapted for a control system for grouping image capturing devices. The control system for grouping image capturing devices includes a plurality of image capturing devices and an electronic device. The plurality of image capturing devices are connected to the electronic device through wires or wirelessly, and are controlled by the electronic device. Another system for grouping image capturing devices includes a plurality of image capturing devices, an electronic device, and a server. The plurality of image capturing devices are connected to the server through Internet and the electronic device is connected to the server through Internet to control the plurality of image capturing devices.

The plurality of image capturing devices are installed in the same area and capture the live-view of the area towards different directions. Each of the plurality of image capturing devices has a direction detection unit for indicating the current direction of the image capturing device. The current direction refers to the current field of view, direction, or other current capturing status of each of the plurality of image capturing devices. The embodiment is for illustrating but not for limiting the present disclosure. The following explanation takes the current field of view of each of the image capturing devices as an example.

The image capturing device applies electronic compass or firmware to determine the current direction. When the electronic compass is applied, the image capturing device obtains the current capturing direction of the image capturing device, such as 35 degrees east of the north or 20 degrees west of the south. When the firmware is applied to define the current direction, the north of the area is firstly defined as 0 degree and an image capturing device capturing towards the east has a current direction of 90 degrees. The embodiment of applying electronic compass or firmware to define the current direction of the image capturing device is for illustrating but not for limiting the present disclosure.

When a user applies the control method and the system for grouping image capturing devices to capture a specified region, in the step S101, the user provides a steering command to at least two image capturing devices with the electronic device. In the step S101, the user's command further includes selecting at least two or all image capturing devices to turn and sending the specified region information which the user wants to capture to the selected image capturing devices.

In the step S103, the steering angle is calculated according to the current direction of the image capturing device and the specified region. For example, when the current capturing direction of the image capturing device is towards north and the specified region of the user is towards east, the calculated steering angle of the image capturing device is 90 degrees clockwise.

The method of calculating the steering angle can be using the computing unit of the image capturing device or using the electronic device or the server of the system, and then the steering angle calculated by the server or electronic device is sent to the image capturing device. The present embodiment is for illustrating but not for limiting the present disclosure.

In the step S105, each of the plurality of image capturing devices is driven to the specified region to perform capturing according to the calculated steering angle. The specified region is a capturing spot or a capturing direction. For example, the user can indicate a latitude and longitude coordinate or a street name as the capturing spot and indicated part or all of the image capturing devices to capture the indicated capturing spot. The user is also able to indicate a capturing direction, such as north, and indicate part or all the image capturing devices to capture towards north. Indicating a capturing spot allows the user to follow the status of a specific area, and indicating a capturing direction makes all of the cameras to turn to the same direction and is convenient for the user to track the movements of a dynamic object. Other embodiments are described for further explanation as follows.

The image capturing device applied by the control method for grouping image capturing devices is but not limited to Pan-Tilt-Zoom (PTZ) camera or Fish-Eye camera. The devices and the operations of the PTZ camera and Fish-Eye camera are separately explained as follows.

Figure 2:
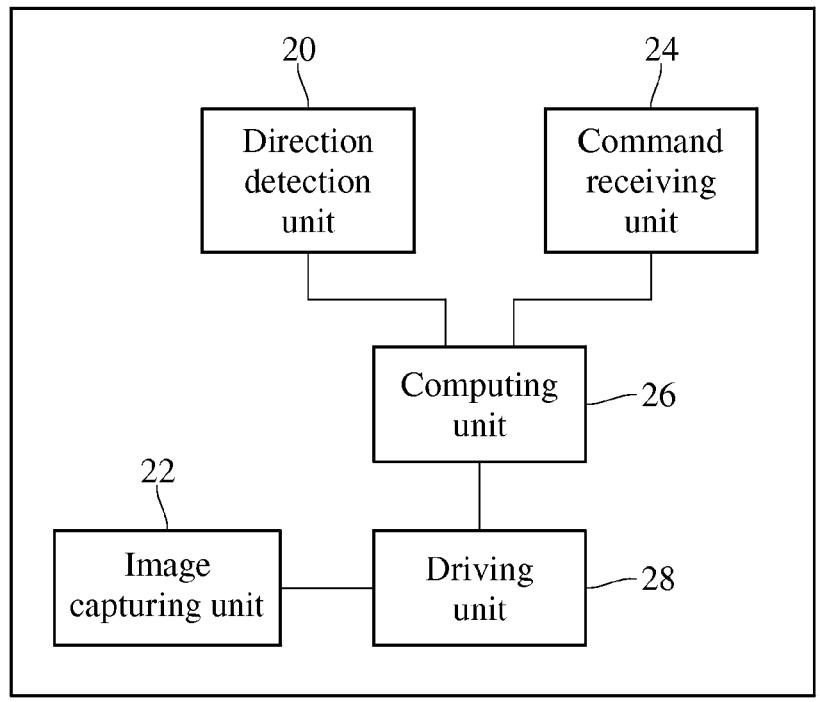
FIG. 2 is a block diagram of the image capturing device according to another embodiment.
Figure 3:
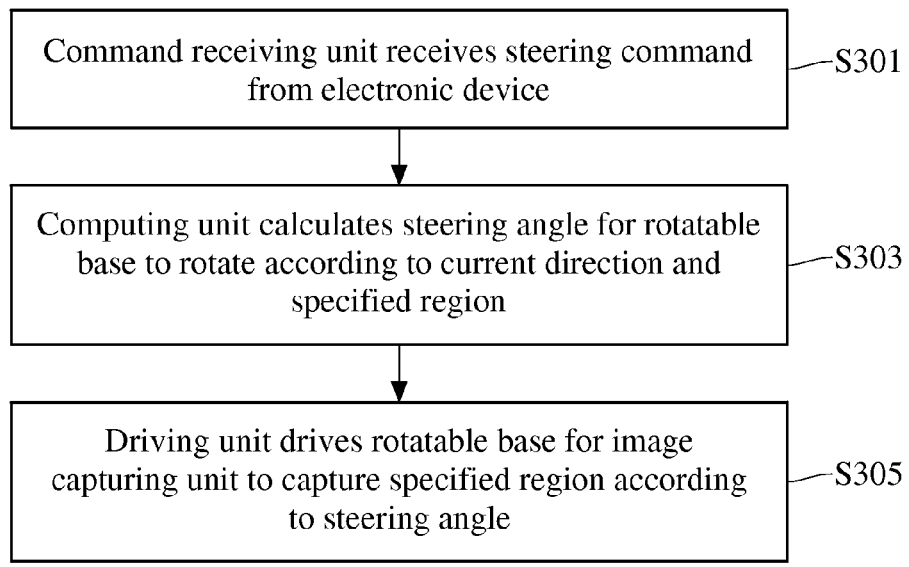
FIG. 3 is a flowchart of the control method for image capturing devices according to an embodiment.

Please refer to FIG. 2 and FIG. 3 together. FIG. 2 is a block diagram of the image capturing device according to another embodiment. FIG. 3 is a flowchart of the control method for image capturing devices according to an embodiment. As shown in FIG. 2 and FIG. 3, the PTZ camera has a rotatable base, a direction detection unit 20, an image capturing unit 22, a command receiving unit 24, a computing unit 26, and a driving unit 28. The image capturing unit 22 is on the rotatable base and the field of view of the image capturing unit 22 is adjusted by rotating the rotatable base. The direction detection unit 20 is but not limited to an electronic compass, a firmware of the PTZ camera, or other techniques for indicating the current direction of the PTZ camera. In the present embodiment, the PTZ camera takes the electronic compass as the direction detection unit 20. The electronic compass is on the rotatable base and the indicated direction is in association with the capturing direction of the image capturing unit 22. The direction detection unit 20 and the command receiving unit 24 are electrically connected to the computing unit 26 and are for providing the current direction and the specified region to the computing unit 26. The driving unit 28 is electrically connected to the computing unit 26 and the image capturing unit 22 and is for receiving the steering angle calculated by the computing unit 26. The driving unit 28 drives the image capturing unit 22 to turn to the specified region according to the steering angle.

When the user selects the PTZ camera to turn the PTZ camera to the specified region for capturing, in the step S301, the command receiving unit 24 of the PTZ camera receives the steering command sent by the electronic device and the PTZ camera obtains the specified region indicated by the steering command. In the step S303, the computing unit 26 of the PTZ camera receives the current direction from the direction detection unit 20 and calculates a steering angle for the rotatable base to turn according to the current direction and the specified region. In the step S305, the PTZ camera drives the rotatable base according to the steering angle, so that the image capturing unit 22 turns to the specified region to perform capturing.

Figure 4:
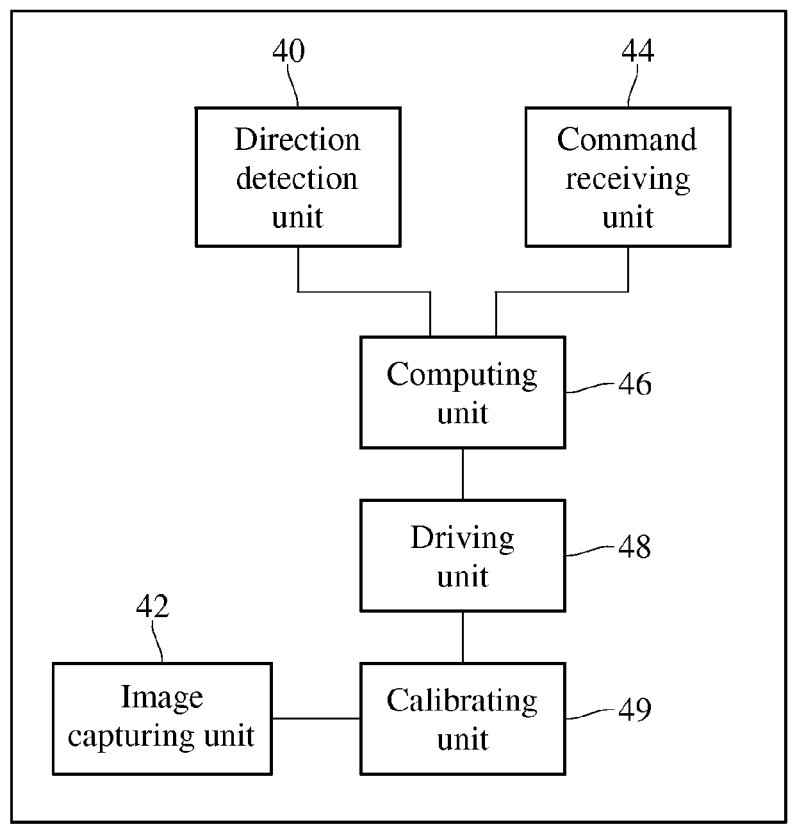
FIG. 4 is a block diagram of the image capturing device according to a further embodiment.
Figure 5:
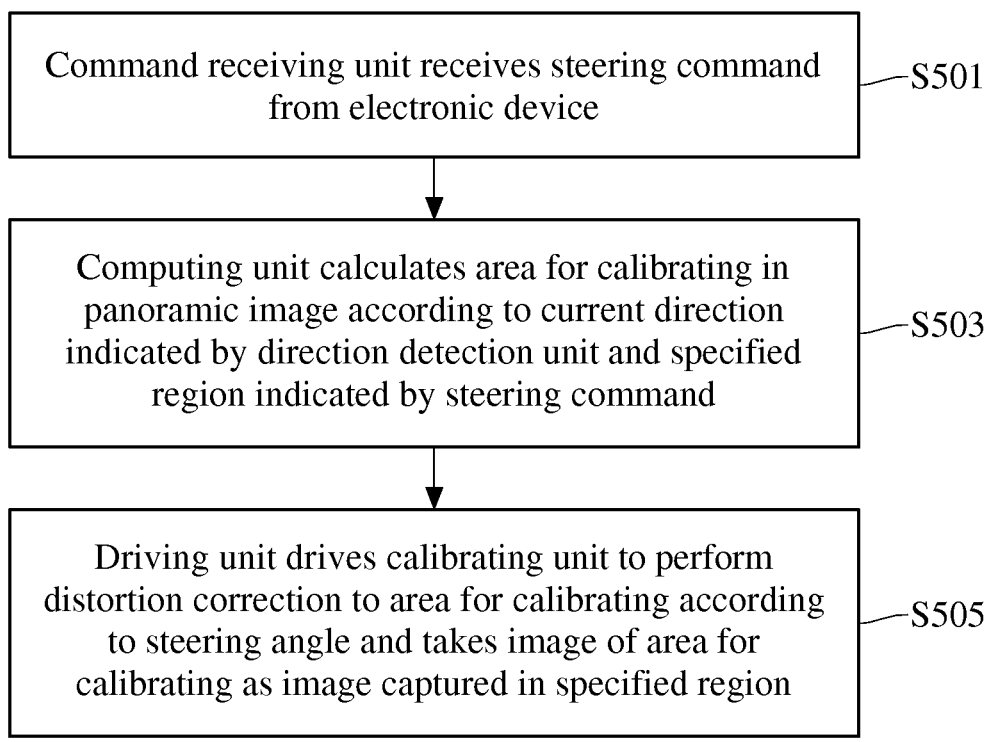
FIG. 5 is a flowchart of the control method for image capturing devices according to a further embodiment.

Please refer to FIG. 4 and FIG. 5 together. FIG. 4 is a block diagram of the image capturing device according to a further embodiment. FIG. 5 is a flowchart of the control method for image capturing devices according to a further embodiment. As shown in FIG. 4 and FIG. 5, the Fish-Eye camera has a direction detection unit 40, an image capturing unit 42, a command receiving unit 44, a computing unit 46, a driving unit 48, and a calibrating unit 49. The image capturing unit 42 captures the panoramic image of the area through a special lens. The direction detection unit 40 is but not limited to an electronic compass, a firmware applied to the Fish-Eye camera, or other techniques for indicating the current direction of the Fish-Eye camera. In the present embodiment, the firmware is taken as an example for explanation. Assuming that the firmware applied to the Fish-Eye camera defines the north of the area as 0 degree and the current direction of the Fish-Eye camera is indicated as 0 degree, the Fish-Eye camera performs distortion correction to a part of area for calibrating in the north in the panoramic image of the area, and outputs the calibrated image. The definition of the area for calibrating is but not limited to a rectangle area in the panoramic image or a circular sector spreading out from the center of the panoramic image. For example, the area for calibrating which is defined as 0 degree is the circular sector centered in 0 degree and with a scope from 15 degrees clockwise to 15 degrees counterclockwise. The magnitude of the circular sector angle of the circular sector is defined according to the system designer's needs. The present embodiment is for illustrating but not for limiting the present disclosure.

When the Fish-Eye camera is selected by the user to perform capturing towards a specified region, in the step S501, the command receiving unit 44 of the Fish-Eye camera receives the steering command which is sent by the electronic device and indicates the Fish-Eye camera to capture the specified region. In the step S503, the computing unit 46 of the Fish-Eye camera calculates the area for calibrating in the panoramic image according to the current direction from the direction detection unit 40 and the specified region indicated by the steering command. For example, originally the current direction of the Fish-Eye camera is 0 degree and the outputted image is the area for calibrating of 0 degree defined by the distortion correction. When specified region indicated by the steering command received by the Fish-Eye camera is 90 degrees, the Fish-Eye camera calculates the steering angle for the area for calibrating to rotate from 0 degree to 90 degrees. In the step S505, the driving unit 48 of the Fish-Eye camera drives the calibrating unit 49 to perform distortion correction to the area for calibrating defined as 90 degrees according to the calculated steering angle, and takes the image of the calibrating the area for calibrating defined as 90 degrees as the image of the captured specified region.

Figure 6:
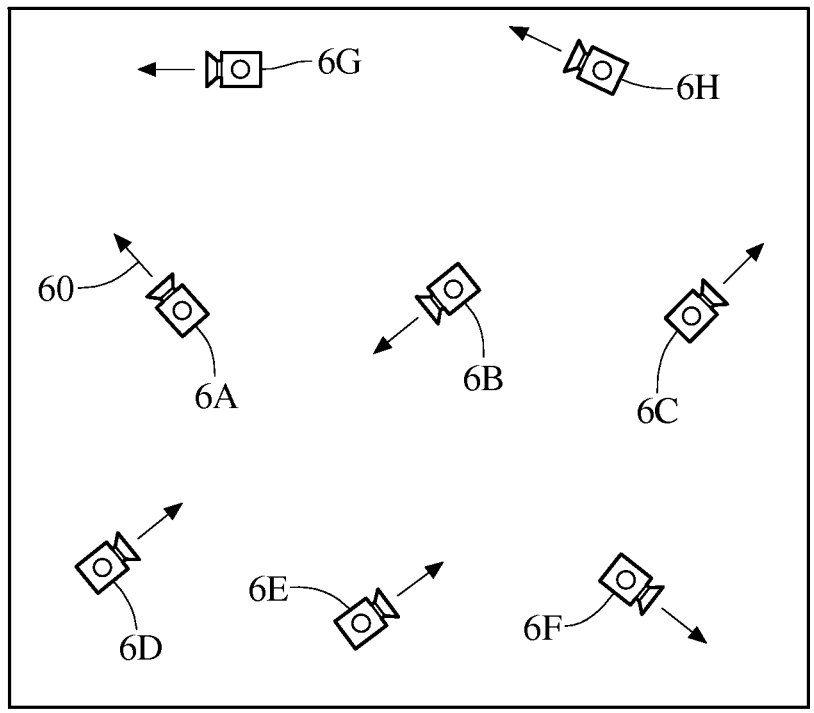
FIG. 6 is a diagram of the control system for grouping image capturing devices according to an embodiment.
Figure 7:
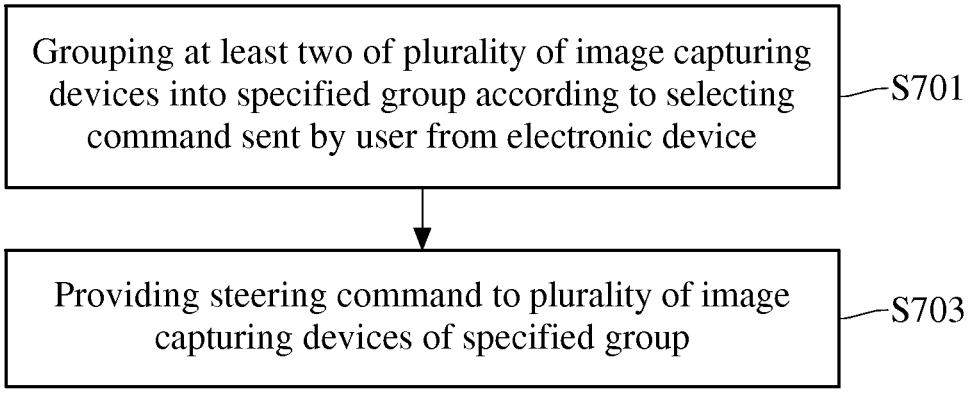
FIG. 7 is a flowchart of the grouped image capturing device according to an embodiment.

Please refer to FIG. 6 and FIG. 7 together. FIG. 6 is a diagram of the control system for grouping image capturing devices according to an embodiment. FIG. 7 is a flowchart of the grouped image capturing device according to an embodiment. As shown in FIG. 6 and FIG. 7, there are 8 image capturing devices 6A~6H installed in the area and the image capturing devices 6A~6H capture the live-view towards different current direction 60. In the step S701, when the user gives the selecting command of the selected 6 image capturing devices 6A~6F in the electronic device, the image capturing devices 6A~6F are grouped as a specified group. In the step S703, the specified region indicated by the steering command is provided to the image capturing devices 6A~6F in the specified group. In the present embodiment, the image capturing devices 6A~6H are PTZ cameras.

Figure 8:
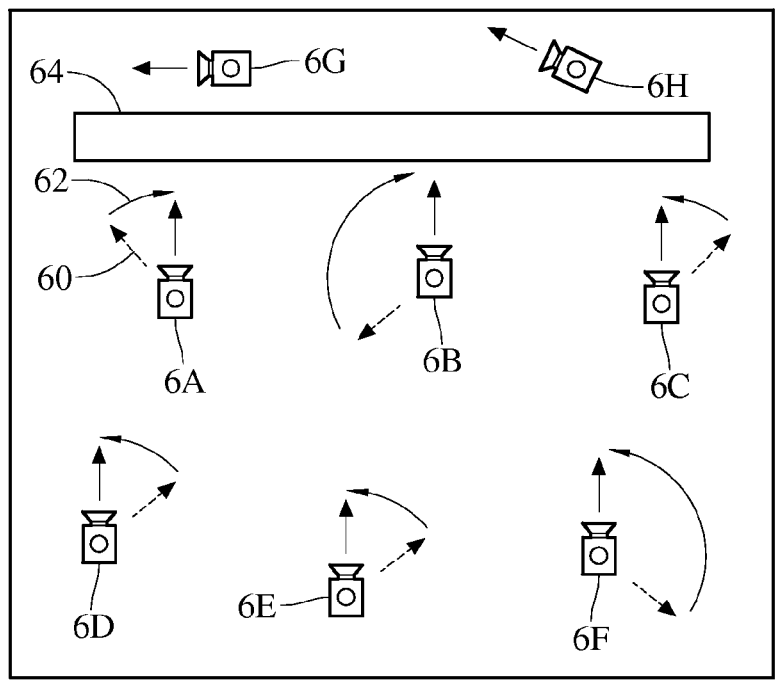
FIG. 8 is a diagram of controlling the image capturing devices to turn to a specified region according to an embodiment.

Please refer to FIG. 8. FIG. 8 is a diagram of controlling the image capturing devices to turn to a specified region according to an embodiment. As shown in FIG. 8, when the steering command of the user indicates the north of the image capturing devices 6A~6F as the specified region 64 for capturing, each steering angle 62 of the image capturing devices 6A~6F is calculated according to the current direction 60 and the specified region 64. In the present embodiment, each steering angle 62 is calculated by the individual computing unit of each of the image capturing devices 6A~6F. The driving unit of each of the image capturing devices 6A~6F drives the rotatable base to rotate according to the steering angle 62, so that the image capturing unit captures towards the north. The magnitude and the direction of the steering angle 62 are defined according to the system designer's needs and is not limited by the present embodiment. As shown in FIG. 8, the direction is not specified in the present embodiment and the image capturing devices 6A~6F rotate with the steering angle 62 as a smaller angle.

Figure 9:
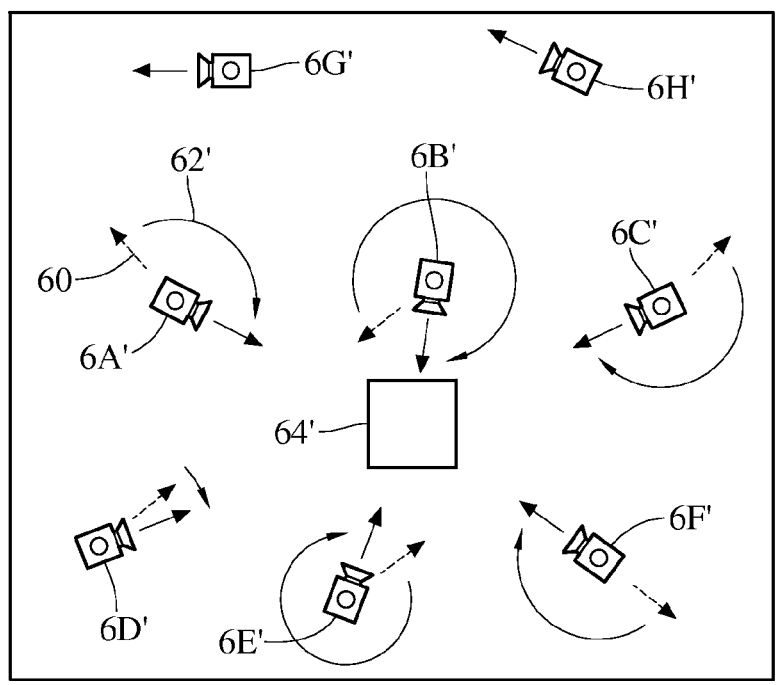
FIG. 9 is a diagram of controlling the image capturing devices to turn to a specified region according to another embodiment.

Please refer to FIG. 9. FIG. 9 is a diagram of controlling the image capturing devices to turn to a specified region according to another embodiment. As shown in FIG. 9, when the steering command of the user indicates the image capturing devices 6A'~6F' to capture towards a specific point of the specified region 64', such as the central rectangle area in the figure, the steering angle of each of the image capturing devices 6A'~6F' is calculated according to the direction of the specific point and the current direction 60' of the image capturing devices 6A'~6F'.

The computing unit for calculating the steering angle is in the image capturing device, the electronic device, or the server. In the present embodiment, the steering angle is calculated by the server and the server calculates the steering angle 62' of each of the image capturing devices 6A'~6F' according to the current direction 60' of each of the image capturing devices 6A'~6F' and the user specified region 64' from the electronic device, and sends the steering angle 62' to the corresponding image capturing device 6A'~6F'. The driving unit drives the rotatable base of each of the image capturing devices 6A'~6F' to rotate according to the received steering angle 62' to capture towards the specific spot of the specified region 64'. As shown in the figure of the present embodiment, the steering angle 62' of each of the image capturing devices 6A'~6F' is clockwise. Therefore, no matter what the magnitude of the steering angle is, all of the image capturing devices 6A'~6F' rotate clockwise to the specified region 64' to perform capturing.

The selection method of the image capturing device is but not limited to the instant selection on the electronic device. In addition, the image capturing device, the electronic device or the server can have a preset specified group and directly send the steering command to the preset specified group. Another method for indicating the image capturing devices is also temporarily saving a preset specified group in the image capturing device, the electronic device, or the server, and sending the steering command to the previously indicated specified group when sending the steering command again.

For example, in the control system for grouping image capturing devices, a preset specified group including the image capturing devices 6A~6D is set in advance and a specified group including the image capturing devices 6A, 6D, 6E is set to capture the specified region in the previous action. When the user wants to select some image capturing devices for grouping to capture another specified region, the user can select the preset image capturing devices 6A~6D as the specified group, or the previously selected image capturing devices 6A, 6D, 6E as the specified group, or selecting other image capturing devices as a new specified group to capture the specified region.

Figure 10A:
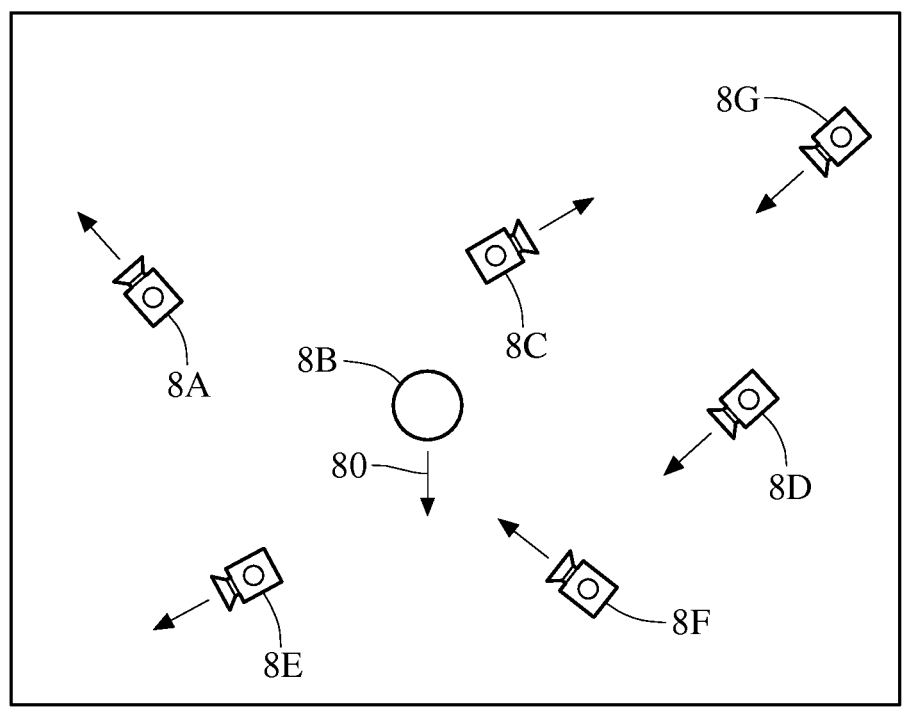
FIG. 10A is a diagram of the control system for grouping image capturing devices according to a further embodiment.
Figure 10B:
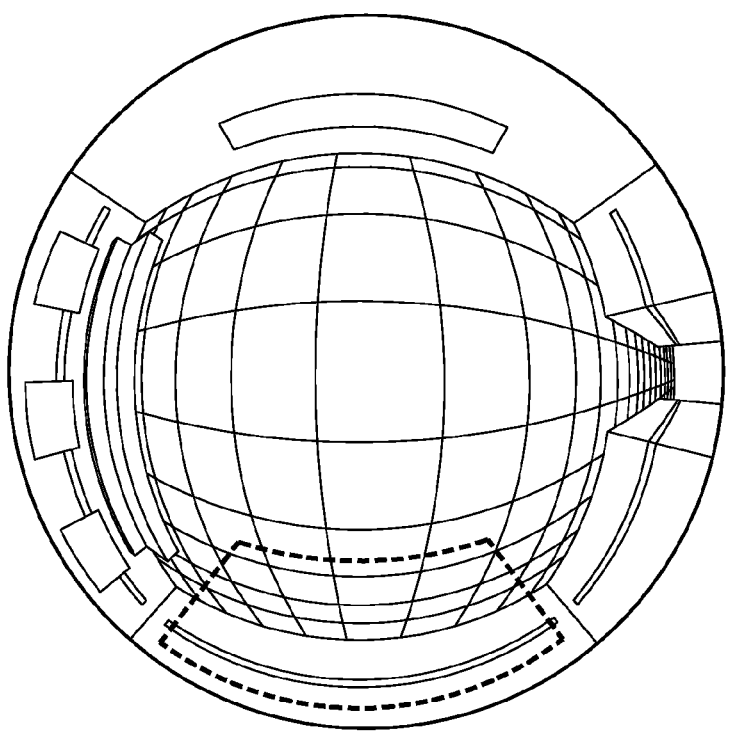
FIG. 10B is a diagram of the area for calibrating according to a further embodiment.
Figure 10C:
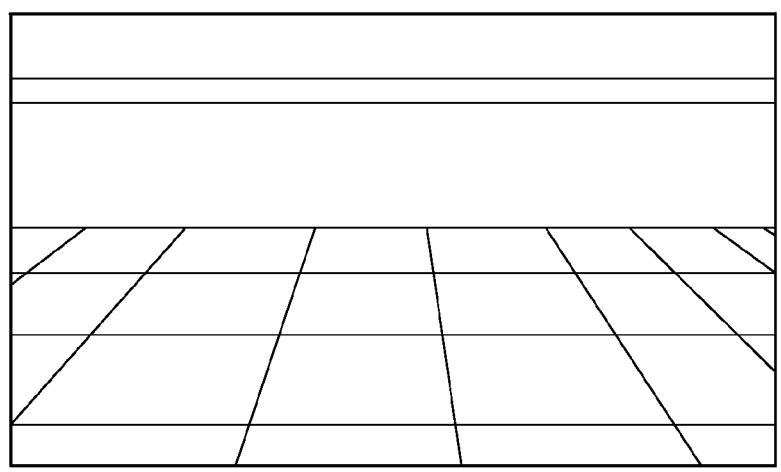
FIG. 10C is a diagram of performing distortion correction to the area for calibrating according to a further embodiment.
Figure 10D:
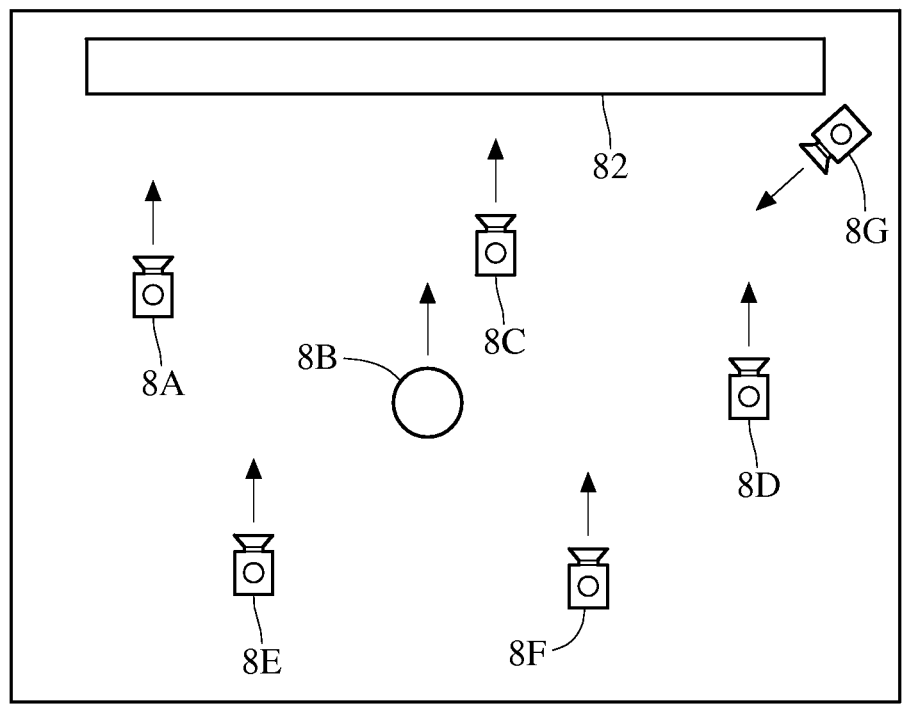
FIG. 10D is a diagram of controlling the image capturing devices to turn to a specified region according to a further embodiment.
Figure 10E:
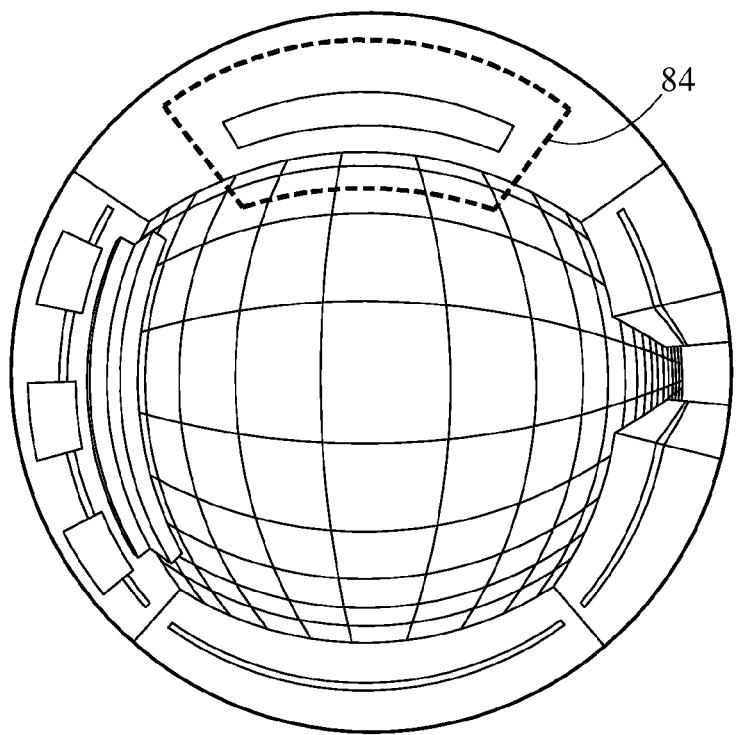
FIG. 10E is a diagram of the area for calibrating of the specified region according to a further embodiment.
Figure 10F:
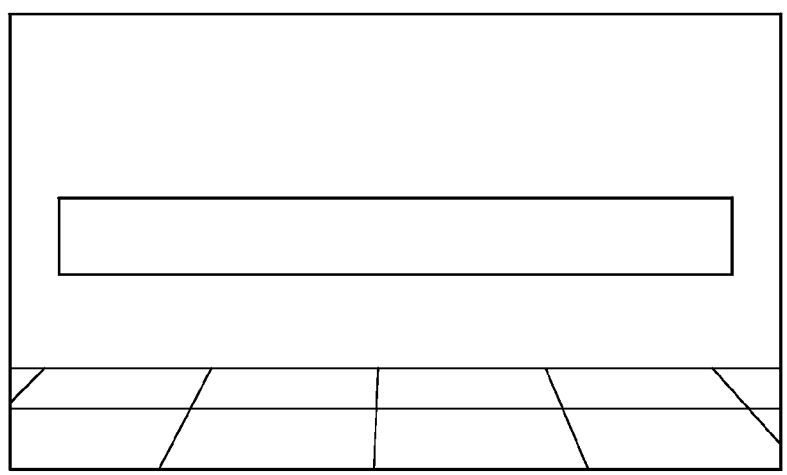
FIG. 10F is a diagram of performing distortion correction to the area for calibrating of the specified region according to a further embodiment.

Please refer to FIG. 10A to FIG. 10F together. FIG. 10A is a diagram of the control system for image capturing devices according to a further embodiment. FIG. 10B is a diagram of the area for calibrating according to a further embodiment. FIG. 10C is a diagram of the distortion corrected area for calibrating according to a further embodiment. FIG. 10D is a diagram of controlling the image capturing devices to turn to a specified region according to a further embodiment. FIG. 10E is a diagram of the area for calibrating of the specified region according to a further embodiment. FIG. 10F is a diagram of performing distortion correction to the area for calibrating of the specified region according to a further embodiment.

As shown in the figures, there are 6 image capturing devices 8A~8G installed in the area. The image capturing device 8A and the image capturing devices 8C~8G are PTZ cameras and the image capturing device 8B is a Fish-Eye camera, and each of the cameras performs capturing towards different current direction. When the image capturing devices 8A~8F are grouped as the specified group, the user is able to select the wanted specified region with the electronic device and sends the steering command to the image capturing devices 8A~8F.

The method for the user to indicate the specified region for capturing with the electronic device is providing a control interface for the user to select the specified region for capturing in the electronic device. The control interface can provide a regional map corresponding to the area or a direction selection unit. The regional map records all locations of the image capturing devices 8A~8G for the user to more clearly select the specified region for capturing and the image capturing devices 8A~8F for grouping. The direction selection unit is for the user to choose a direction as the specified region, such as the direction selection unit indicating the east, west, south, and north. For example, the user can select the west from the direction selection unit as the specified region for capturing.

In addition to the previous methods provided by the electronic device for the user to select the specified region 82, the electronic device can also provide a direction detection unit which is similar to the direction detection unit of the image capturing devices 8A~8G to detect the direction of the electronic device as the specified region for capturing. For example, when the electronic device faces towards the west, and the electronic device sends the steering command to indicate the image capturing devices 8A~8F in the specified group to face towards the west. The direction detection unit installed in the electronic device is convenient for the user to intuitively send the steering command indicating the specified region 82 for capturing to the image capturing devices 8A~8F in the specified group.

Among the image capturing devices 8A~8G, the image capturing device 8A and 8C~8G are PTZ cameras. The operations of the cameras are explained in the previous embodiment and are not further described hereinafter. The difference between the present embodiment and the previous embodiment is that the image capturing device 8B is a Fish-Eye camera. Before group setting, the image of the region captured by the image capturing device before distortion correction is shown in FIG. 10B and the image of the region captured by the image capturing device after distortion correction is shown in FIG. 10C. When the image capturing device 8B receives the steering command, the command receiving unit of the image capturing device 8B receives the steering command sent by the electronic device and the steering command indicates the image capturing device 8B to capture the specified region 82 as shown in FIG. 10D. The computing unit of the image capturing device calculates the area for calibrating 84 in the panoramic image according to the current direction 80 determined by the direction detection unit and the specified region 82 indicated by the steering command. The driving unit drives the calibrating unit to perform distortion correction to the area for calibrating 84. The area for calibrating after distortion correction is outputted as shown in FIGS. 10E and 10F.

In the present embodiment, because the Fish-Eye camera is able to obtain the panoramic image in the area, the user can determine the specified region for capturing by according to the panoramic image captured by the Fish-Eye camera and group other image capturing devices, such as PTZ cameras, to turn to the specified region for capturing. Combining the Fish-Eye camera and the PTZ camera increases the practicability of the control system for grouping image capturing devices.

Please refer to FIG. 11A to FIG. 11D together. FIG. 11A-11D are diagrams of the control system for grouping image capturing devices and the display unit according to another embodiment. As shown in the figures, at least one display unit 106 is further provided in the present disclosure. The display unit 106 has a plurality of displayed regions 108a~108i and the locations of the plurality of displayed regions 108a~108i correspond to the locations of the image capturing devices 100a~100i in the physical area. The images captured by the image capturing devices 100a~100i are outputted to the locations corresponding to the displayed regions 108a~108i.

For example, there are 9 image capturing devices 100a~100i installed in a railway platform. The image capturing devices 100a~100c in the left side and the image capturing device 100g~100i in the right side are for capturing the two sides of the track 102. The image capturing devices 100d~100f in the middle are for capturing the railway platform 104.

9 image capturing devices 100a~100i are connected to a display unit 106 for displaying images. The display unit 106 has a plurality of displayed regions 108a~108i and each of the plurality of displayed regions 108a~108i is for displaying the images captured by the corresponding image capturing device 100a~100i. The locations of the displayed regions 108a~108i in the display unit 106 correspond to the locations of the image capturing devices 100a~100i in the physical area, and the image capturing devices 100a~100i output the images to the corresponding locations of the displayed regions 108a~108i. For example, the images captured by the image capturing device 100a are displayed in the corresponding location of the display unit 108a, and the images captured by the image capturing device 100b are displayed in the corresponding location of the display unit 108b, and so forth. The images captured by the image capturing devices 100c~100i are displayed in the display units 108c~108i according to the correspondence.

Figure 11A:
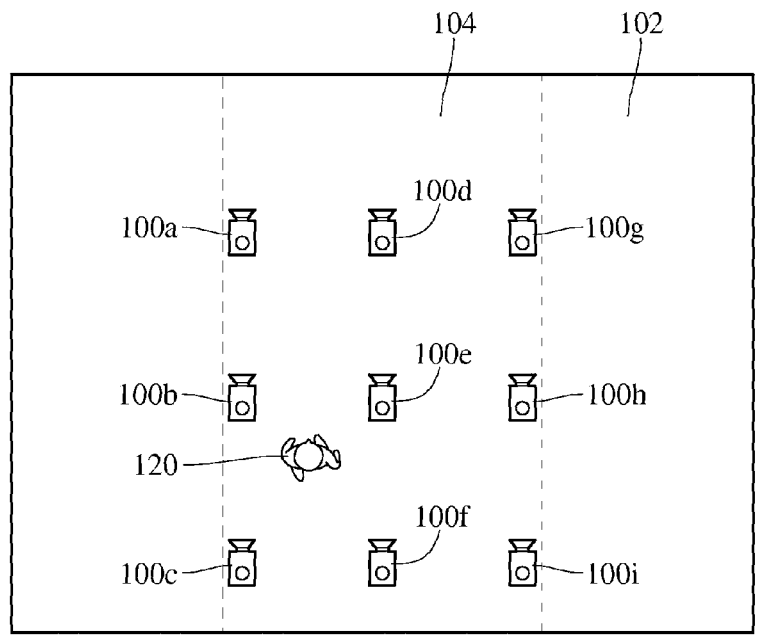
FIG. 11A~11D are diagrams of the control system for grouping image capturing devices and the display unit according to another embodiment.
Figure 11B:
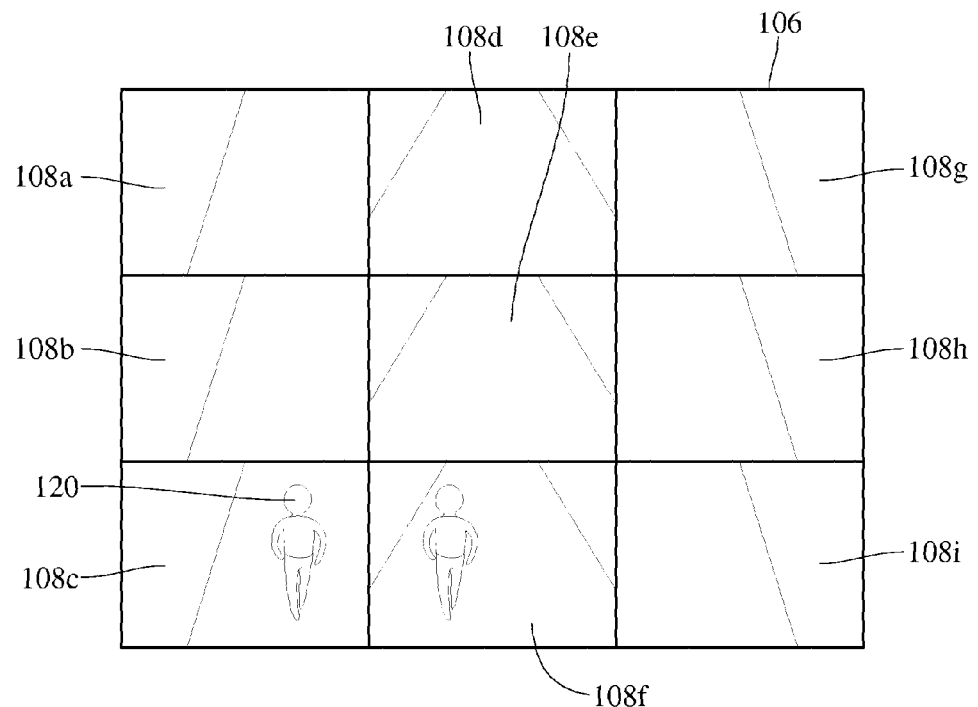
Figure 11C:
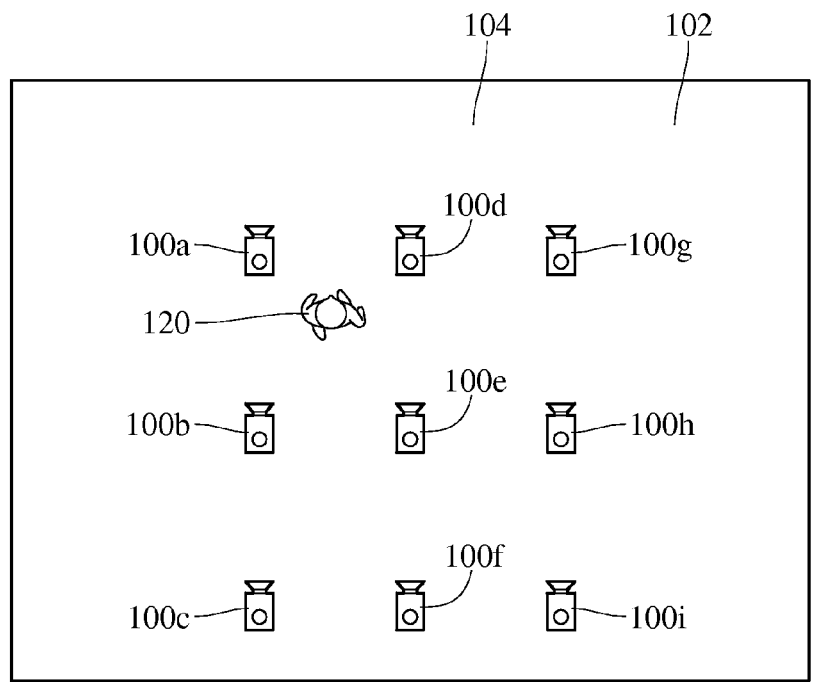
Figure 11D:
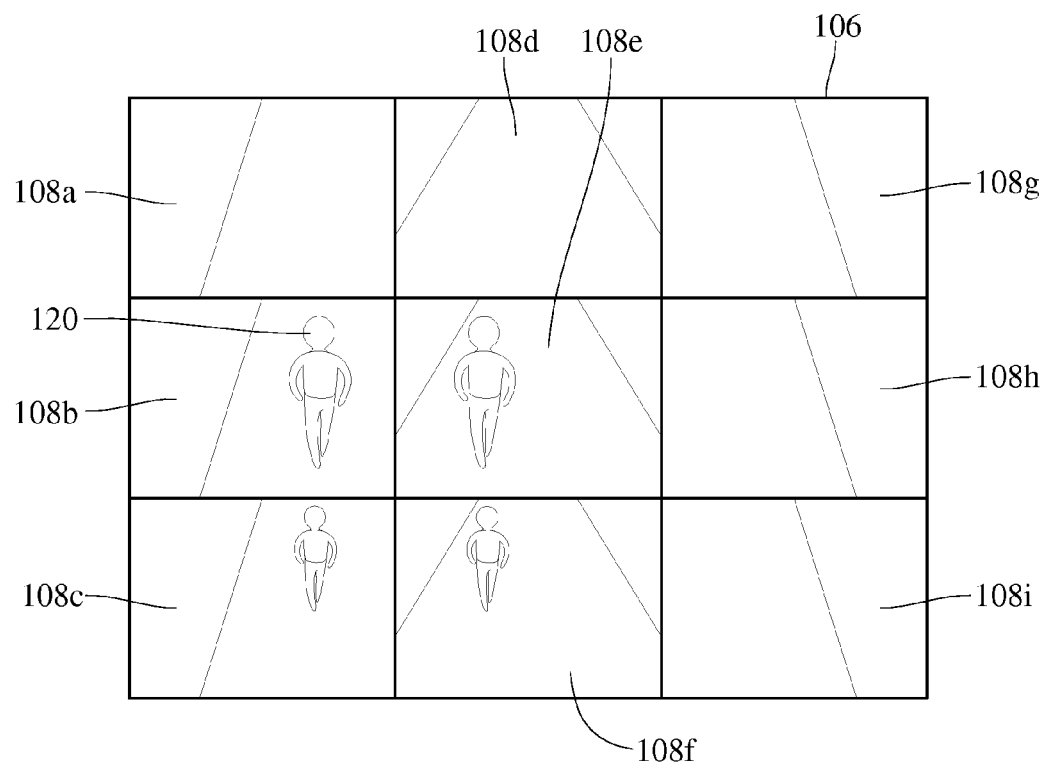

When the user wants to track the dynamic status of a mover 120 in a railway platform 106, the user groups the 9 image capturing devices 100 and indicates the image capturing devices 100 to capture towards the mover 120. As shown in FIG. 11A, when the location of the mover 120 is between the image capturing device 100c and 100f, the display unit 106 displays the image of the mover 102 in the displayed regions 108c and 108f shown in FIG. 11B. As shown in FIG. 11C, when the mover moves forward to the place between the image capturing device 100b and 100e, the display unit 106 shows that the mover 102 gradually disappears in the displayed regions 108c and 108f and appears in the displayed regions 108b and 108e shown in FIG. 11D. Therefore, the user can observe the track of the mover 120 in the display unit 106.

The control method for grouping image capturing devices uses the image capturing device or the control system for grouping image capturing devices for users to group part or all of the image capturing devices with the electronic device to control the grouped image capturing devices to turn to the specified region or perform distortion correction to the image of the specified region, so that the image of the specified region outputted and users can obtain the status of the specified region or track the dynamic status of a mover in the area. Controlling the image capturing device individually is avoided and the efficiency of monitoring the area is increased.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A control method for grouping image capturing devices adapted for controlling a plurality of image capturing devices, each of the plurality of image capturing devices having a direction detection unit for indicating a current direction, the method comprising:
providing a steering command to at least two of the plurality of image capturing devices, the steering command indicating a specified region;
for each of the plurality of image capturing devices receiving the steering command, calculating a steering angle according to the current direction and the specified region; and
driving each of the plurality of image capturing devices receiving the steering command to capture the specified region according to the steering angle;
wherein the step of providing a steering command to at least two of the plurality of image capturing devices, the steering command indicating a specified region comprises:
grouping at least two of the plurality of image capturing devices into a specified group according to a selecting command; and
providing the steering command to the plurality of image capturing devices of the specified group;
wherein for the at least two of the plurality of image capturing devices of the specified group, the calculations of the steering angles are independent.

2. The method of claim 1, wherein the step of driving each of the plurality of image capturing devices receiving the steering command to capture the specified region according to the steering angle comprises:
performing distortion correction to an area for calibrating and taking an image of the area for calibrating as an image captured in the specified region.

3. The method of claim 2, wherein the step of calculating the steering angle comprises:
each of the plurality of image capturing devices receiving the steering command calculating the area for calibrating in a panoramic image according to the specified region.

4. An image capturing device, comprising:
a direction detection unit for indicating a current direction;
an image sensor for capturing an image of the current direction;
a command receiving unit for receiving a steering command, the steering command indicating a specified region;
a computing unit coupled to the direction detection unit and the command receiving unit for calculating a steering angle according to the current direction and the specified region; and
a driving unit coupled to the image sensor for driving the image capturing device to capture the specified region according to the steering angle;
wherein the image capturing device is grouped into a specified group according to a selecting command, and the calculation of the steering angle of the image capturing device is independent from another image capturing device of the specified group.

5. The image capturing device of claim 4, further comprising:
a calibrating unit coupled to the computing unit, the image sensor, and the driving unit, for performing distortion correction to an area for calibrating in a panoramic image and taking an image of the area for calibrating as an image captured in the specified region.

6. A control system for grouping image capturing devices, comprising:
a plurality of image capturing devices, each of the plurality of image capturing devices comprising:
a direction detection unit for indicating a current direction;
an image sensor for capturing an image of the current direction;
a command receiving unit for receiving a steering command, the steering command indicating a specified region; and
a driving unit coupled to the image sensor for driving the corresponding image capturing device receiving the steering command to capture the specified region, wherein a steering angle is calculated according to the current direction and the specified region; and an electronic device for generating the steering command; wherein the electronic device generates a selecting command for determining at least two of the plurality of image capturing devices as a specified group and providing the steering command to the plurality of image capturing devices in the specified group, and for the at least two of the plurality of image capturing devices of the specified group, the calculations of the steering angles are independent.

7. The system of claim 6, wherein each of the plurality of image capturing devices further comprises:
a computing unit coupled to the direction detection unit and the command receiving unit for calculating the steering angle according to the current direction and the specified region.

8. The system of claim 6, further comprising:
a server for calculating the steering angle according to the current direction of each of the plurality of image capturing devices and the steering command generated by the electronic device and providing the plurality of steering angles to the plurality of corresponding image capturing devices.

9. The system of claim 6, wherein the electronic device provides a control interface, and the control interface has a regional map, and the regional map records a plurality of installation locations corresponding to the plurality of image capturing devices.

10. The system of claim 6, wherein the electronic device provides a control interface and the control interface has at least one direction selection unit for determining the specified region by an indicated direction.

11. The system of claim 6, wherein the electronic device provides a direction detection unit for detecting a direction which the electronic device faces towards and a region which the electronic device faces towards is indicated as the specified region.

12. The system of claim 6, further comprising:
at least one display unit having a plurality of displayed regions, wherein locations of the plurality of displayed regions correspond to locations of the plurality of image capturing devices in a physical region, and images captured by the plurality of image capturing devices are outputted to corresponding locations of the plurality of displayed regions.

\* \* \* \* \*